(12) United States Patent
Slotznick et al.

(10) Patent No.: US 7,882,434 B2
(45) Date of Patent: Feb. 1, 2011

(54) USER PROMPTING WHEN POTENTIALLY MISTAKEN ACTIONS OCCUR DURING USER INTERACTION WITH CONTENT ON A DISPLAY SCREEN

(75) Inventors: Benjamin Slotznick, 507 Third St., Mt. Gretna, PA (US) 17064; Stephen C. Sheetz, Lebanon, PA (US)

(73) Assignee: Benjamin Slotznick, Mt. Gretna, PA (US)

( * ) Notice: Subject to any disclaimer, the term of this patent is extended or adjusted under 35 U.S.C. 154(b) by 993 days.

(21) Appl. No.: 10/876,750

(22) Filed: Jun. 25, 2004

(65) Prior Publication Data

US 2004/0268266 A1 Dec. 30, 2004

Related U.S. Application Data

(60) Provisional application No. 60/483,325, filed on Jun. 27, 2003.

(51) Int. Cl.
*G06F 3/00* (2006.01)
*G06F 3/048* (2006.01)

(52) U.S. Cl. ............ 715/710; 715/705; 715/707; 715/708; 715/711

(58) Field of Classification Search ........ 715/710, 715/745, 811, 812, 708, 744, 705, 707, 711; 714/46
See application file for complete search history.

(56) References Cited

U.S. PATENT DOCUMENTS

| | | | | |
|---|---|---|---|---|
| 4,500,964 A | * | 2/1985 | Nickle | 714/46 |
| 4,964,077 A | * | 10/1990 | Eisen et al. | 715/707 |
| 5,233,513 A | * | 8/1993 | Doyle | 705/7 |
| 5,255,386 A | * | 10/1993 | Prager | 707/5 |
| 5,287,102 A | | 2/1994 | McKiel, Jr. | |
| 5,452,439 A | * | 9/1995 | Makino | 715/710 |
| 5,528,739 A | | 6/1996 | Lucas et al. | |
| 5,581,684 A | * | 12/1996 | Dudzik et al. | 715/708 |

(Continued)

OTHER PUBLICATIONS

Speaks for Itself Talking Web Sites, printout from web site: http://www.speaksforitself.com/speaksforitself/talkingsites.cfm?CFID=1327376&CFTOKEN=48412529 DirectXtras, Inc., printout date: Feb. 15, 2002, original web page posting date: unknown, 4 pages.

(Continued)

*Primary Examiner*—Ba Huynh
*Assistant Examiner*—Nicholas Augustine
(74) *Attorney, Agent, or Firm*—Panitch Schwarze Belisario & Nadel LLP

(57) ABSTRACT

A method is provided for prompting a user who interacts with content on a display screen via a pointing device that a potential mistake may have been made during the interaction. The interaction includes a plurality of actions associated with the content of the display screen. The content is created by programming code. Programming code is analyzed to determine the next most likely action to occur during user interaction with the display screen contents at a plurality of different points in the programming code. After an action occurs by a user at a point in the programming code, it is detected whether the user performed the next most likely action. The user is prompted with an indication if the user did not perform the next most likely action and therefore may have made a potential mistake.

54 Claims, 3 Drawing Sheets

U.S. PATENT DOCUMENTS

| | | | | |
|---|---|---|---|---|
| 5,634,084 | A | * | 5/1997 | Malsheen et al. ............ 704/260 |
| 5,715,370 | A | | 2/1998 | Luther et al. |
| 5,748,186 | A | | 5/1998 | Raman |
| 5,801,692 | A | * | 9/1998 | Muzio et al. ................. 715/764 |
| 5,805,465 | A | * | 9/1998 | Itoh ........................... 702/182 |
| 5,827,066 | A | * | 10/1998 | Henter ........................ 434/188 |
| 5,867,386 | A | * | 2/1999 | Hoffberg et al. .............. 700/83 |
| 5,899,975 | A | | 5/1999 | Nielsen |
| 5,920,477 | A | * | 7/1999 | Hoffberg et al. ............. 382/181 |
| 6,005,570 | A | * | 12/1999 | Gayraud et al. ............. 715/709 |
| 6,018,710 | A | | 1/2000 | Wynblatt et al. |
| 6,023,714 | A | * | 2/2000 | Hill et al. ..................... 715/235 |
| 6,085,161 | A | | 7/2000 | MacKenty et al. |
| 6,113,394 | A | * | 9/2000 | Edgar .......................... 434/179 |
| 6,115,482 | A | * | 9/2000 | Sears et al. .................. 382/114 |
| 6,115,686 | A | | 9/2000 | Chung et al. |
| 6,144,377 | A | * | 11/2000 | Oppermann et al. ........ 715/744 |
| 6,198,904 | B1 | * | 3/2001 | Rosen ..................... 434/307 R |
| 6,232,957 | B1 | * | 5/2001 | Hinckley ..................... 345/156 |
| 6,233,570 | B1 | * | 5/2001 | Horvitz et al. ................ 706/11 |
| 6,308,042 | B1 | * | 10/2001 | Marsh et al. ............ 434/307 R |
| 6,324,511 | B1 | * | 11/2001 | Kiraly et al. ................. 704/260 |
| 6,334,157 | B1 | * | 12/2001 | Oppermann et al. ........ 719/310 |
| 6,340,977 | B1 | * | 1/2002 | Lui et al. ..................... 715/709 |
| 6,434,508 | B1 | * | 8/2002 | Lin et al. ..................... 702/153 |
| 6,442,523 | B1 | | 8/2002 | Siegel |
| 6,503,085 | B1 | * | 1/2003 | Elkind ......................... 434/236 |
| 6,568,939 | B1 | * | 5/2003 | Edgar .......................... 434/179 |
| 6,580,416 | B1 | * | 6/2003 | Gardner ....................... 345/157 |
| 6,583,781 | B1 | * | 6/2003 | Joshi et al. ................... 345/156 |
| 6,665,642 | B2 | | 12/2003 | Kanevsky et al. |
| 6,708,152 | B2 | | 3/2004 | Kivimaki |
| 6,728,763 | B1 | | 4/2004 | Chen |
| 7,047,498 | B2 | * | 5/2006 | Lui et al. ..................... 715/762 |
| 7,194,411 | B2 | * | 3/2007 | Slotznick et al. ............ 704/271 |
| 7,242,988 | B1 | * | 7/2007 | Hoffberg et al. .............. 700/28 |
| 7,448,042 | B1 | * | 11/2008 | Engber et al. ............... 719/313 |
| 7,668,787 | B2 | * | 2/2010 | Bier ............................. 706/11 |
| 7,669,111 | B1 | * | 2/2010 | Krause et al. ............... 715/200 |
| 2002/0065658 | A1 | | 5/2002 | Kanevsky et al. |
| 2002/0118220 | A1 | * | 8/2002 | Lui et al. ..................... 345/709 |
| 2002/0167534 | A1 | * | 11/2002 | Burke .......................... 345/629 |
| 2002/0178007 | A1 | * | 11/2002 | Slotznick et al. ......... 704/270.1 |
| 2002/0196277 | A1 | * | 12/2002 | Bushey et al. ............... 345/745 |
| 2004/0036715 | A1 | * | 2/2004 | Warren ........................ 345/713 |
| 2004/0119682 | A1 | * | 6/2004 | Levine et al. ............... 345/156 |
| 2004/0186713 | A1 | * | 9/2004 | Gomas et al. ............... 704/235 |
| 2005/0125425 | A1 | * | 6/2005 | Friedman et al. ............ 707/100 |
| 2007/0220365 | A1 | * | 9/2007 | Castellani et al. ............. 714/46 |

OTHER PUBLICATIONS

Bonner, P., "And Web Sites for All," Internet Professional-Solutions for Web Designers and Builders, PC Magazine, May 7, 2002, IP01-IP03 (3 pages).

International Search Report for PCT/US02/06041, mail date: May 31, 2002, 1 page.

International Preliminary Examination Report (IPER) for PCT/US02/06041, mailed Dec. 13, 2002, 4 pages.

Corrected International Preliminary Examination Report (IPER) for PCT/US02/06041, mailed Apr. 3, 2003, 10 pages.

BrowseAloud User Manual dated Aug. 23, 2002, printout from Spectronics web site: http://www.spectronicsinoz.com/library.asp?article=12331&display=print, printout date: Jul. 25, 2003, 4 pages.

BrowseAloud Screen Reader, Press Release dated Nov. 26, 2002, printout from Access Ingenuity web site: http://www.accessingenuity.com/Product%20Pages/browsealoudpressrelease.htm, printout date: Jul. 25, 2003, 2 pages.

Microsoft Agent 2.0 Setup (includes step to Install the Lernout & Hauspie TruVoice Text-to-Speech Engine), printout from web site: http://www.msagentring.org/setup.htm printout date: Feb. 15, 2002, original web page posting date: unknown, 2 pages.

HELP Read Beta .92, printout from web site: http://www.davecentral.com/projects/helpread/ printout date: Feb. 26, 2001, original web page posting date: unknown, 2 pages.

CAST eReader, printout from web site: http://www.cast.org/udl/index.cfm?i=211 printout date: Feb. 26, 2001, original web page posting date: unknown, 5 pages.

JAWS Screenreader for the Blind and Visually Impaired, printout from web site: http//www.worklink.net/jaws.htm, printout date: Feb. 20, 2001, original web page posting date: unknown, 1 page.

Parsing with Perl Modules by Teodor Zlatonov, printout from IBM web site: http://www-106.ibm.com/developerworks/linux/library/perl-parsing/ printout date: Feb. 15, 2002, article date: Apr. 2000, 6 pages.

DevGuru HTML core attribute: onmouseover, printout from web site: http://www.devguru.com/Technologies/html/quickref/html_core_onmouseover.html printout date: Feb. 11, 2002, original web page posting date: unknown, 2 pages.

Clickless Ad, printouts from cnet.com web site: http://builder.cnet.com/webbuilding/0-7600-8-5828510-1.html?tag=st.bl.7600-8-5828113-1.txt.7600-8-... printout date: Feb. 15, 2002, date submitted to web site: Jun. 24, 1998, original web page posting date: unknown, 3 pages.

HTML Tutorials: Span Tag, printout from web site: http://hypergurl.com/span.html printout date: Feb. 8, 2002, original web page posting date: unknown, 2 pages.

Clickless Link by Joey Mornin, printouts from web site: http://www.scriptlib.com... printout date: Feb. 12, 2002 and Feb. 15, 2002, original web page posting date: unknown, 5 pages.

Events and Event Handlers: onMouseOver, printout from Netscape web site: http://developer.netscape.com/docs/manuals/communicator/jsref/evnt17.htm printout date: Feb. 15, 2002, original web page posting date: unknown, 2 pages.

WordSmith v2.0 article describing Jan. 15, 2001 product launch, printout from Sight and Sound Technology website: http://www.sightandsound.co.uk/pages/WordSmith_intro_print.htm, printout date: Jul. 25, 2003, 2 pages.

textHELP!® Support Centre, Discussion Area with message posting about BrowseAloud from May 16, 2001 through Jul. 18, 2002, printouts from textHELP website (and links therein): http://www.texthelp.com/discussion/forum.asp?ForumID=5&section=support, printout date: Jul. 25, 2003, 8 pages.

Search Report for GB0509518.7 Patent Application, mail date of Search Report: Jul. 6, 2005, 1 page.

* cited by examiner

USER PROMPTING WHEN POTENTIALLY MISTAKEN ACTIONS OCCUR DURING USER INTERACTION WITH CONTENT ON A DISPLAY SCREEN

CROSS-REFERENCE TO RELATED APPLICATIONS

This application claims the benefit of U.S. Provisional Application No. 60/483,325 filed Jun. 27, 2003 entitled "METHOD OF ISSUING SPORADIC MICRO-PROMPTS FOR SEMI-REPETITIVE TASKS."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Many people have difficulty reading. Causes include poor schooling, poor vision, mental retardation, dementia and other cognitive limitations.

Software, frequently called screen reader software, has been designed to read electronic text to people who have difficulty reading. Some screen readers, such as JAWS by Freedom Scientific, are designed for people who are blind. Other screen readers, such as the eReader by CAST, are designed for people who have learning disabilities such as dyslexia. Some screen readers, such as the WebTrek by AbleLink Technologies and the Talking Browser by Point-and-Read are designed for people with cognitive limitations such as mental retardation. Screen readers reduce the need to have human readers for people with disabilities.

People with cognitive limitations sometimes need "strict sequencing" in order to learn to do a task and may need prompting to finish the task. "Strict sequencing" means reducing a task (such as making a bed, mopping a floor or using a coffee maker) to a set of sub-tasks that must be accomplished in a particular order.

For example, using a coffee maker involves taking out the old filter, throwing it away, getting a new filter putting the filter in the machine, filling the filter with ground coffee, closing the machine, getting measuring cup for water, filling the cup with water, pouring the water in the machine, turning on the machine, turning on the timer, pouring out the coffee when the timer rings, and turning off the machine. In addition, people with cognitive limitations from time to time forget a sub-task, and must be reminded of it in order to complete the task correctly and safely. For example, forgetting to put the water in the coffee machine will not only mean that the machine cannot produce coffee, but might also pose a hazard of electrical fire if the machine is turned on. In many situations, aides or helpers will prompt the individual to finish a sub-task if the individual forgets or attempts to omit it.

"Prompting" means reminding a person to do something, with the prompt given at the time the person forgets to do it.

The prompt can be concrete and definite (e.g., "Turn off the stove.") or "abstract and amorphous" (e.g., "Isn't there something you have to finish?"). A prompt can be a command or a question. In any event, a prompt reminds a person to do (or finish) something they just forgot about. A prompt can be words or gestures or signals. For example pointing to the coffee pot may be a prompt to turn it off. A blinking light or buzzer may be a prompt for a particular action. Word prompts can be spoken (via human or synthesized voice) or printed (consider a card with the word "quiet" that a school librarian holds up when children are noisy or a pop-up message on a computer).

There is software designed to help people with cognitive disabilities remember task sequences and prompt them as necessary. For example, there is audio-visual software designed to make simple videos (e.g., making a bed) both to train people in tasks, and to allow them to check off the parts of the task done (e.g., Visual Impact by AbleLink). When a sub-task is checked off, the software can remind the user to do the next subtask. There is also software that can be loaded onto a PDA (i.e. a hand-held personal digital assistant such as a Palm Pilot) that a person carries around, that will remind him or her of important subtasks of things he or she is doing, provide prompts as necessary, and allow check offs of sub-tasks accomplished (e.g., Pocket Coach by AbleLink). (Such prompts can remind a person to turn off the coffee pot and put house keys in the person's pocket before leaving the house.) Such software and hardware can reduce the need for human aides to provide prompting. Sometimes, software for a specific task includes prompting, such as AbleLink's WebTrek (for browsing) and WebTrek Connect (for recording and sending voice mail).

Some of this prompting software requires the user to manually indicate the completion of each subtask (such as by pressing a physical button or clicking on an "on-screen" picture of a button). Other software will talk the user through every step and each subtask every time the software is used. There is other software, such as Microsoft's Office Assistant, which will try to determine what type of task the user is trying to do (e.g., write a letter), and then "ask" if the user wants help doing it. The "asking" can be through voice recordings, computer synthesized speech or an on-screen text message.

There are some tasks, however, like reading, that have many subtasks (i) which are repeated over and over continually if not continuously in a variety of similar but different patterns, (ii) which people (especially those with cognitive disabilities) occasionally forget, and (iii) which when missed can prevent successful completion of the task. Such tasks may be referred to as being "semi-repetitive." Repeated prompting will reduce (but not necessarily eliminate) the amount of prompting needed.

For example, in reading English, one must (a) read one sentence after another, (b) read from left to right, and (c) at the end of a line of text swoop back to the leftmost part of the next line. People with cognitive disabilities, particularly if they also have visual disabilities, may have a hard time accomplishing all three tasks all of the time, even with assistive software. But if a non-reader is using screen reading software and the non-reader skips a sentence, or reads the wrong sentence, it can alter the meaning of the written passage or even cause the user to lose all sense of where the user is reading on the page. If the user forgot to do each subtask every time, there would be almost continual prompts, because of the fine granularity of the subtasks. Such prompts may be referred to as "micro-prompts." Micro-prompts are prompts given when most subtasks are of fine granularity and could be subject to a prompt. If a micro-prompt was issued for every subtask, the micro-prompts would be issued incessantly. For most users, any particular micro-prompt may only need to be issued sporadically. There is no available prompting software to assist with such sporadic micro-prompts for semi-repetitive tasks.

BRIEF SUMMARY OF THE INVENTION

The invention teaches a method of providing sporadic micro-prompts for semi-repetitive tasks. The invention will stop incipient actions while the prompt is issued, allowing the user to respond to the prompt and correct the mistake. In some embodiments, corrections or other actions are made by the software if the user ignores the prompts.

BRIEF DESCRIPTION OF THE DRAWINGS

The above summary, as well as the following detailed description of a preferred embodiment of the invention, will be better understood when read in conjunction with the following drawings. For the purpose of illustrating the invention, there is shown in the drawings embodiments that are presently preferred, and an example of how the invention is used in a real-world project. It should be understood that the invention is not limited to the precise arrangements and instrumentalities shown. In the drawings.

DETAILED DESCRIPTION OF THE INVENTION

Figure 1:
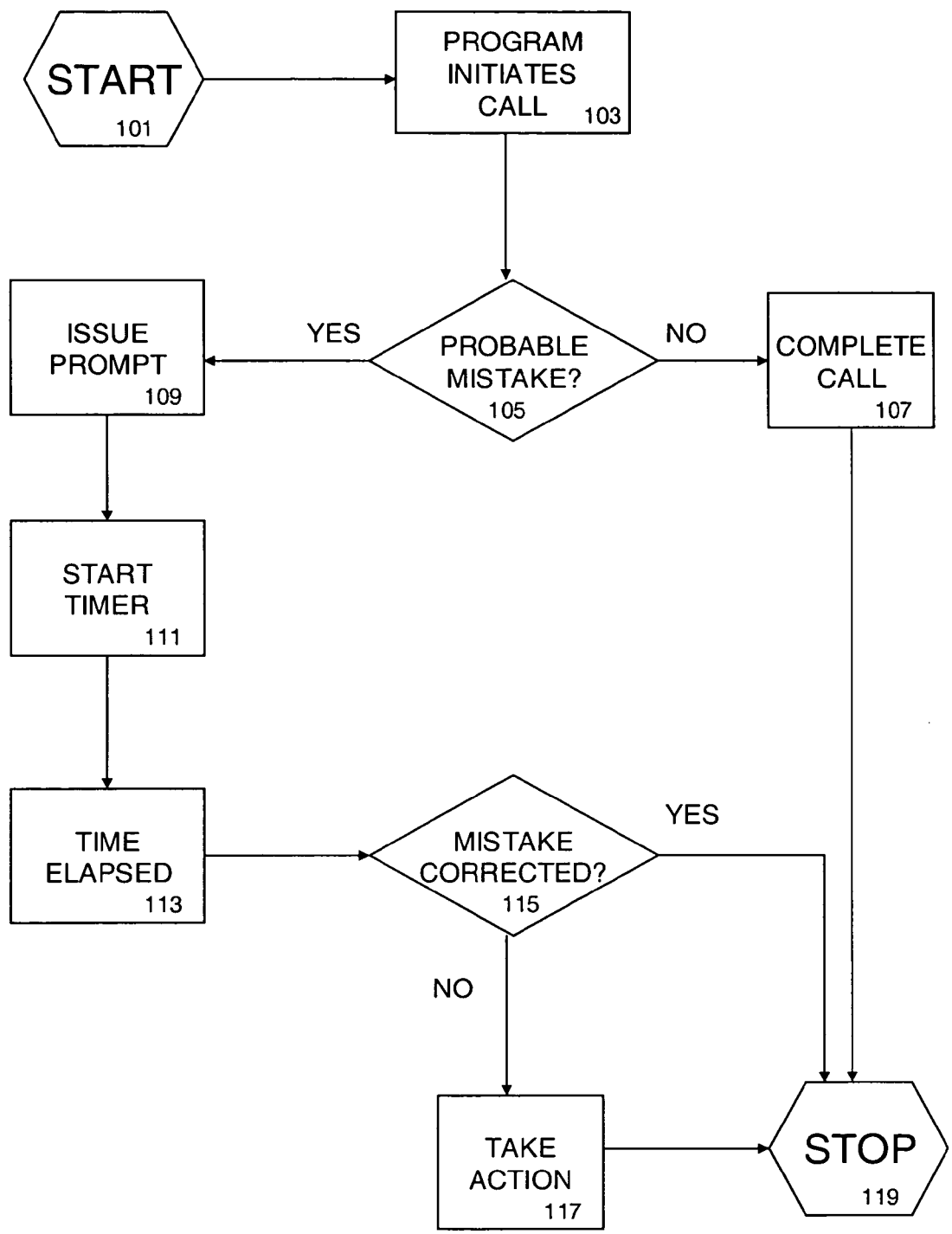
FIG. 1 shows a flowchart of prompting a user who interacts with content on a display screen to indicate that a potential mistake may have been made during the interaction in accordance with one preferred embodiment of the present invention.

Certain terminology is used herein for convenience only and is not to be taken as a limitation on the present invention. In the drawings, the same reference letters are employed for designating the same elements throughout the several figures.

One preferred embodiment is a screen reader which incorporates a variety of micro-prompts for semi-repetitive tasks. In particular, consider a screen reader in which the user puts the computer cursor over a sentence or link to indicate which sentence or link should be read by the computer's synthesized speech. See, for example, U.S. Patent Application Publication No. 2002/0178007 (Slotznick et al.) entitled "Method of displaying web pages to enable user access to text information that the user has difficulty reading" (Point-and-Read), which is incorporated herein by reference. In this screen reader, the sentence is automatically highlighted in yellow to delineate to the non-reader what sentence is being pointed to. In the default mode, leaving the cursor over the sentence for a short pre-specified time will cause the computer to read the sentence using synthesized speech. Moving the cursor over a sentence without stopping will not trigger synthesized speech.

The screen reader in this preferred embodiment will highlight hyperlinks in blue. When the cursor is over a hyperlink, the screen reader will only read the words in the hyperlink, not the whole sentence, although the part of the sentence that is not the hyperlink is highlighted in yellow. (In this manner, the user can see the whole sentence as well as the hyperlink beneath the cursor.) If the user keeps the cursor over the hyperlink after the computer has read the link, the computer will activate the link.

SCENARIO 1: Most of the time the user of this screen reader wants to read one sentence after another, but sometimes the user will want to skip around the page.

This legitimate variation in routine makes the task only semi-repetitive. For example, the user may be looking at a page depicting various oil paintings from a museum with picture caption beneath each. It is not necessary to look at the pictures or read their captions in any particular order. As another example, the user may be reading an online newspaper or other web page with different "stories," articles, or items scattered around the page. Again, it is not usually necessary to read the articles in any particular order, although within an article, one would most likely need to read one sentence after another. One may very well be reading an article, sentence by sentence, and then desire to read the caption of a picture that the article refers to, thus interrupting the repetition of the routine.

However, as discussed above, non-readers, particularly those with cognitive disabilities, visual disabilities, or hand-motor-control disabilities, may have a hard time reading every sentence in the correct order. The user with disabilities may skip a sentence from time to time and needs to be prompted to correct that mistake.

In the preferred embodiment, the computer keeps an array or list of all sentences on the page, (although the array or list might not be accessible from the programming interface.) Comparing the order of sentences is done by examining the array index, or by using the name of the span-type tag which demarcates the sentence. For example, in one embodiment in which the tag is <PNR:SENTENCE> and the tag acts as a span tag, each sentence tag gets a unique "id" property corresponding to its order in the document. In this example, the sentences may be ordered as follows:

```
<PNR:SENTENCE ... id="WebreaderText0" ...> sentence 0
</PNR:SENTENCE>
<PNR:SENTENCE ... id="WebreaderText1" ...> sentence 1
</PNR:SENTENCE>
<PNR:SENTENCE ... id="WebreaderText2" ...> sentence 2
</PNR:SENTENCE>
``` and so forth. The computer uses an internal (non-visible) pointer to the array to keep track of which sentence is being read. The array pointer remains on that sentence until a new sentence is read. When the computer finishes reading a sentence, the user can put the cursor over a new sentence. Whenever the cursor is over a new sentence, a timer starts. If the cursor remains over the sentence for the predetermined amount of time, the computer will attempt to read the sentence aloud.

However, suppose the sentence that is queued to be read is not the next sentence in the order of the "id" value (see example above), but follows that next sentence. The invention will (a) interpret this as a probable mistake, (b) not read the sentence, and (c) issue a prompt. In a preferred embodiment, the computer will highlight the correct sentence in orange (as opposed to the normal yellow) and play the following digitized pre-recorded voice message: "To hear the next sentence, move the cursor over the sentence highlighted in orange."

In a preferred embodiment, the computer will just wait for the correct action to be taken before proceeding. This is similar to some specially coded electronic tutorials, but will work with any electronic text.

In an alternative embodiment, the computer will wait a preset time during which the user can correct his or her mistake. However, if the user does not move the computer cursor in that time, the software will interpret this action as an affirmation that the user deliberately intended to skip the orange highlighted sentence and will read the yellow highlighted sentence over which the user placed the cursor.

In an alternative embodiment, the computer will wait a preset time during which the user can correct his or her mistake, but after that time the software will correct the mistake by moving the cursor over the orange highlighting.

In yet another alternative embodiment, the computer will wait a preset time during which the user can correct his or her mistake, but after that time the software will issue a new prompt (play a new pre-recorded message, which may be the same or different from the first one).

When the next sentence is on the same line as the first sentence, the user can just move the computer cursor along the first sentence till he or she comes to the next sentence. However, sometimes individuals with reading and/or sequencing problems have difficulty finding the next sentence when the current sentence spans more than one line, that is, when part of the sentence is at the end of one line and the sentence extends (or wraps) to the beginning of the next line.

The problem is that the user may have to move the computer cursor off all sentences before placing it over the correct next sentence, or may have to cross over sentences that are not the next sentence before coming to the right one. In each case, the sentence they have just read will no longer be highlighted while they are continuing to search for the next one. Some individuals with intellectual disabilities have lost their place on the page while trying to accomplish this task.

An alternative embodiment of this invention uses the following subtle visual prompt. After a sentence has been read aloud by the computer, if the user moves the computer cursor off that sentence, but not over the next sentence, the sentence that has just been read will be highlighted by the computer in a different color or manner (e.g. in orange), and will remain so highlighted until the user causes another sentence or link to be read. This is a subtle visual prompt because it appears after each sentence is read, but no additional verbal prompt is given.

In an alternative embodiment, after a sentence having been read and the sentence will always be highlighted in a different color or manner (e.g. in orange) until the user causes another object (e.g. sentence or link) to be read.

In an alternative embodiment, the just-read sentence will be highlighted in a distinctive manner (e.g. in orange), but if the user still skips a sentence, the computer will give a verbal prompt as well, such as ("To hear the next sentence, move the cursor to the sentence after the one highlighted in orange.")

In an alternative embodiment, the prompt occurs when a sentence is skipped and the new sentence queued to be read is in the same paragraph as the one that has been skipped (or the first sentence of the next paragraph is queued and the last sentence of the previous paragraph had been skipped) but not otherwise. In other words, it is not considered a mistake for the user to deliberately skip a paragraph or stop reading one paragraph and move to a distinct other part of the page. To do this, the parser assigns values to different paragraphs, as demarcated by HTTP "new paragraph" signs. A new array stores a number or reference indicating the paragraph to which each sentence belongs:

| Array index | Javascript reference to <PNR:SENTENCE> tag | Paragraph number |
| --- | --- | --- |
| 0 | WebreaderText0 | 0 |
| 1 | WebreaderText1 | 0 |
| : | : | 1 |
| : | : | 1 |
| n | WebreaderTextn | 2 |

SCENARIO 2: Most of the time the user of this screen reader wants to read an entire sentence before reading or triggering links embedded in the sentence.

Many times a link will only consist of the words "click here" and the user must read the whole sentence to learn what the link connects to. With this screen reader, if the cursor moves to a new sentence and is over a link, the user must move the cursor to a part of the sentence highlighted in yellow to hear the whole sentence, rather than just the hyperlink. Yet a person with cognitive disabilities may move the cursor over a link and then stop and listen for the computer. This person may forget that he or she must move the cursor off the blue highlighting and onto the yellow highlighting.

In a preferred embodiment of this invention, the computer will know that the user placed the cursor over a link before the computer had read the sentence that the link is embedded in (again using array pointers). The invention will (a) interpret this as a probable mistake, (b) not read the link, and (c) issue a prompt. In a preferred embodiment, the computer will play the following digitized pre-recorded voice message: "To hear this sentence, move the pointer to a part of the sentence highlighted in yellow."

In a preferred embodiment, the computer will just wait for the correct action to be taken before proceeding.

In an alternative embodiment, the computer will wait a preset time during which the user can correct his or her mistake. However, if the user does not move the computer cursor in that time, the software will interpret this action as an affirmation that the user deliberately intended to read the link before the whole sentence and will read the link over which the user placed the cursor.

In an alternative embodiment, the computer will wait a preset time during which the user can correct his or her mistake, but after that time the software will correct the mistake by moving the cursor off the link and onto a non-link part of the sentence highlighted in yellow.

An alternative embodiment does not use array pointers, but rather a set of variable markers as in the following Javascript code (only lines of code essential to understanding how this prompt works are included):

```
// VARIABLES
var bLinkFirst = false;          // true until linkFirst timer ends
var linkFirstTimer = null;       // timer started on sentence mouseover
var bLinkPromptFirstMouse = false;    // user wants the link-first prompt?
// GET USER PREFERENCE
bLinkPromptFirstMouse = (window.external.GetRegString("LinkPromptFirstMouse") == "yes");
// JAVASCRIPT FUNCTIONS
```

-continued

```
function CursorOver(whichItem, theText)
// Called when the mouse moves over a pnr sentence.
{
   ...
   if (bLinkPromptFirstMouse)
   {
      // If cursor goes over a link within 200 ms of this
      // sentence mouseover, it counts as going over the link first
      clearTimeout(linkFirstTimer);
      bLinkFirst = true;
      linkFirstTimer = setTimeout("bLinkFirst = false;", 200);
   }
   ...
}
function CursorOut(whichItem)
// Called when the mouse moves away from a pnr sentence.
{
   ...
   clearTimeout(linkFirstTimer);
   ...
}
function CursorOverLink(whichItem, theText, theUrl, theTarget)
// Called when the mouse moves over a link.
{
   ...
   // Is link within a sentence?
   var sentenceWithin = FindContainingSentence(whichItem);
   // If the cursor was first put over a hyperlink (within a sentence):
   if (bLinkFirst && sentenceWithin)
   {
      if (bLinkPromptFirstMouse) // user wants to play a prompt
      {
         ...
         if (linkColorScheme == 0)
            window.external.PlayLinkPrompt(1); // "Move to yellow"
         else
            window.external.PlayLinkPrompt(2); // "Move cursor to blue"
         return;
      }
      else if (...) // user wants cursor moved off of link
      {
         // Automatically move cursor away from link
         ...
      }
   }
   ...
   // Set usual timer to hear link read
   ...
}
function CursorOutLink(whichItem)
// Called when the mouse moves away from a hyperlink.
{
   ...
   clearTimeout(linkFirstTimer);
   bLinkFirst = true;
   ...
}
```

SCENARIO 3: Most of the time the user of this screen reader wants to read all of the links in a sentence before triggering any of them.

A sentence may contain two different links, one referring to Hawaii and the other to Alaska. A user who cannot read will not know what links are available and which link is which until the user hears both links read by synthesized speech. Yet, a user with cognitive disabilities or hand-motor-control disabilities might listen to the computer read the "Hawaii" link, but because of slow reaction times or poor dexterity may not be able to move the cursor before the link is activated.

In a preferred embodiment of this invention, the computer will know that the user placed the cursor over a link before the computer had read all other links in the sentence that the link is embedded in (again, using array pointers). The invention will (a) interpret this as a probable mistake, (b) not activate the link, and (c) issue a prompt. In a preferred embodiment, the computer will play the following digitized pre-recorded voice message: "Listen to the other underlined links in this sentence before triggering any of them."

In a preferred embodiment, the computer will just wait for the correct action to be taken before proceeding.

In an alternative embodiment, the computer will wait a preset time during which the user can correct his or her mistake. However, if the user does not move the computer cursor in that time, the software will interpret this action as an affirmation that the user deliberately intended to activate the link before reading the other links and will trigger the link over which the user placed the cursor.

In an alternative embodiment, the computer will wait a preset time during which the user can correct his or her mistake, but after that time the software will correct the mistake by moving the cursor off the link and onto another link in the sentence which has not yet been read.

An alternative embodiment does not use array pointers, but rather a set of variable markers as described in the Javascript codes example for Scenario 2 above.

SCENARIO 4: A user may sometimes forget that he or she must take an affirmative action and just wait.

For example, a user with slow reaction times may set preferences on the screen reader so that waiting (with the cursor over a link) will not activate that link, but rather the user must click on the link (using a mouse button or other switch). But because the user is used to having the computer speak after most deliberate cursor movements, the user may sit and wait, forgetting that he or she must click on the link.

In a preferred embodiment of this invention, when the computer would expect an affirmative user action before the computer begins a process, the computer waits a pre-set time period. The invention will (a) interpret this inactivity as a probable mistake, and (b) issue a prompt. In a preferred embodiment, the computer will play the following digitized pre-recorded voice message: "To trigger the link, please click."

An example of the code for this preferred embodiment using Javascript is as follows (only lines of code essential to understanding how this prompt works are included):

```
// VARIABLES
var delayedTextTimer2 = null;       // The timer until link text is read
var bLinkTextStarted = false;       // Text from a hyperlink is being read
var bOverALink = false;             // Is cursor over a hyperlink?
// GET USER PREFERENCES
nHyperlinkReading    = window.external.GetRegVal
("HyperlinkReading");
keyboardReadLink     = window.external.GetRegString
("KeyboardReadLink");
nLinkPromptReading   = window.external.GetRegVal
("LinkPromptReading");
// JAVASCRIPT FUNCTIONS
// Responds to any key being pressed
function OnKeyPress_Handler( )
{
   ...
   if (bOverALink && !bLinkTextStarted &&
   (keyboardReadLink == "any" || (key == 32 &&
   keyboardReadLink == "space")))
   {
      // Read a hyperlink
      ...
   }
   ...
}
function CursorOverLink(whichItem, theText, theUrl, theTarget)
// Called when the mouse moves over a link.
{
   ...
   bOverALink = true;
   ...
   if (nHyperlinkReading > 0) // if user wants links read automatically
   {
      // Set usual timer for link reading
      ... // bLinkTextStarted will be true during speech
   }
   else if (nLinkPromptReading > 0) // user wants link prompt
   {
      delayedTextTimer2 = setTimeout
("window.external.PlayLinkPrompt(3)", nLinkPromptReading);
   }
   ...
}
```

-continued

```
function CursorOutLink(whichItem)
// Called when the mouse moves away from a link.
{
   ...
   bOverALink = false;
   clearTimeout(delayedTextTimer2);
   delayedTextTimer2 = null;
   ...
}
```

In a preferred embodiment, the computer will just wait for the correct action to be taken before proceeding.

In an alternative embodiment, the computer will wait a preset time during which the user can correct his or her mistake. However, if the user does not take the required affirmative action (e.g., clicking) in that time, the software will interpret this inaction as an affirmation that the user deliberately intended to take the action and will do so (e.g., trigger the link over which the user placed the cursor).

In an alternative embodiment, the computer will wait a preset time during which the user can correct his or her mistake, but after that time the software will repeat the prompt.

Similarly, the user may set preferences so that the computer will not read sentences or links or alt tags without an affirmative action such as clicking. Again, the computer would wait a preset time period. The invention would then prompt the user to take the action (e.g., "To hear the link, please click," or "To hear the sentence, please click," or "To hear the picture description, please click.")

The four examples enumerated above are distinct embodiments of the invention that can be incorporated into a screen reader. These are not intended to enumerate all embodiments that might be incorporated into a screen reader or any other software program.

The invention may be embodied as a plug-in, add-on, add-in, Active X control, or extension to an application. The invention may be embodied in code within an application, a module called by that application, or a shell program within which the application works. The invention may be written as an applet, sub-program, or environment. The invention may be in any computer programming language.

In a preferred embodiment, the method of constructing a particular micro-prompt involves the following methods and procedures:

1. At any point (or procedure) in the software program, list the next likely action or actions (based upon what functions and modalities of the software are being used). For example when the user is using Point-and-Read to read a web page, when the cursor is over a sentence and the Talking Browser is reading that sentence, the next likely action is that the user will put the cursor over the next sentence so that the Talking Browser can read the next sentence. Any variety of other rules can be coded to define the next likely action or actions.

2. List other actions (or failure to take action) that are likely mistakes. (It is not expected that all or even most other actions are mistakes.) For example, putting the cursor over a subsequent but non-sequential sentence in the same paragraph—and keeping it there (so that the Talking Browser will read it), suggests that the user had inadvertently skipped a sentence. Non-readers with developmental disabilities have been observed to make this kind of mistake. Putting the cursor somewhere else, such as over a picture or navigation button is more likely intentional and not a mistake. Putting the cursor over a link in the sentence just read is also not a likely mistake. Any failure to choose a most likely action is not necessarily a mistake and is not coded as such. Any variety of rules can be coded to define likely mistakes.

3. Create a prompt. The prompt can be pre-recorded digitized voice, synthesized speech, pop-up text, etc. The prompt will articulate (a) what the user did not do, (b) what the user can choose to do, (c) what action the user might have forgotten. The prompt may be concrete and definite, abstract and amorphous, or otherwise as described above.

4. Set a waiting period.

5. Determine what the computer will do after the waiting period times out. Possible actions include: wait longer, repeat the prompt, issue a different prompt, correct the mistake itself, or recognize the user action as not a mistake and carry it out.

The above listing is not intended to be exclusive or exhaustive. Other embodiments may use different method(s) or procedure(s) to construct any micro-prompt.

FIG. 1 shows a flow chart of an embodiment of the invention. A brief description of the process shown in FIG. 1 is as follows:

START

STEP 1: When a program makes a call to initiate an identified activity (either because of a user affirmative action or the time out of a preset waiting period), the invention first checks the state of inputs to determine if the state represents an identified probable mistake. The mistake may be absolute or relative to the previous state(s).

STEP 2: If the state represents a probable mistake, the invention records and aborts (negates or traps) the program call and issues a prompt.

STEP 3: After a pre-set time period, if the putative mistake is not corrected, the invention takes appropriate, pre-determined action (e.g., continued waiting, additional prompts, action to correct the mistake, or action re-issuing the program call noted in step 1 which now assumes there was no mistake). If the action consists of continued waiting or additional prompts, return to step 2.

END

Referring again to FIG. 1, consider a program which includes an embodiment of the invention. Consider this program to be running. At some point a user takes an affirmative action (or a waiting period times out) which starts the invention (101), by causing the program to make a program call to initiate an identified activity (103). The invention first checks the state of inputs to determine if the state represents a previously identified probable mistake (105). The mistake may be absolute or relative to the previous state(s). If not, then the program call is completed (107) and the process stops (119).

On the other hand, if the state represents a probable mistake, the program call is not completed and a prompt is issued (109). After the prompt is issued, a timer is started (111). After a preset time has elapsed (113), the program checks whether the mistake has been corrected (115). The state had been considered a probable mistake, because some action had not been taken, or some state(s) not entered into. There are usually many valid states, and only a few that will be considered a mistake. What the program is checking at (115), is whether that action had been taken, or one of the acceptable states entered into. If a correction has been made, the process stops (119).

If a correction has not been made, the program takes predetermined action (117). In many cases, this would be taking action to correct the mistake. Then the process would stop (119).

Alternatively, there could be no action at all, freezing the process until the correction was made. Alternatively, the program could restart the timer (going back to 111). Alternatively, the prompt could be reissued (going back to 109). Alternatively, and not pictured, a different prompt could be issued, instituting a new timing loop.

Alternatively, the program could use the lack of correction as an indication that the state or action was intentional and no mistake occurred. In that case the program call would be completed (going to 107) and then the process would stop (119).

As described above, one preferred embodiment of the present invention is used with HTML (Hyper Text Mark-up Language) code. HTML is the basic programming code for the web.

Figure 2:
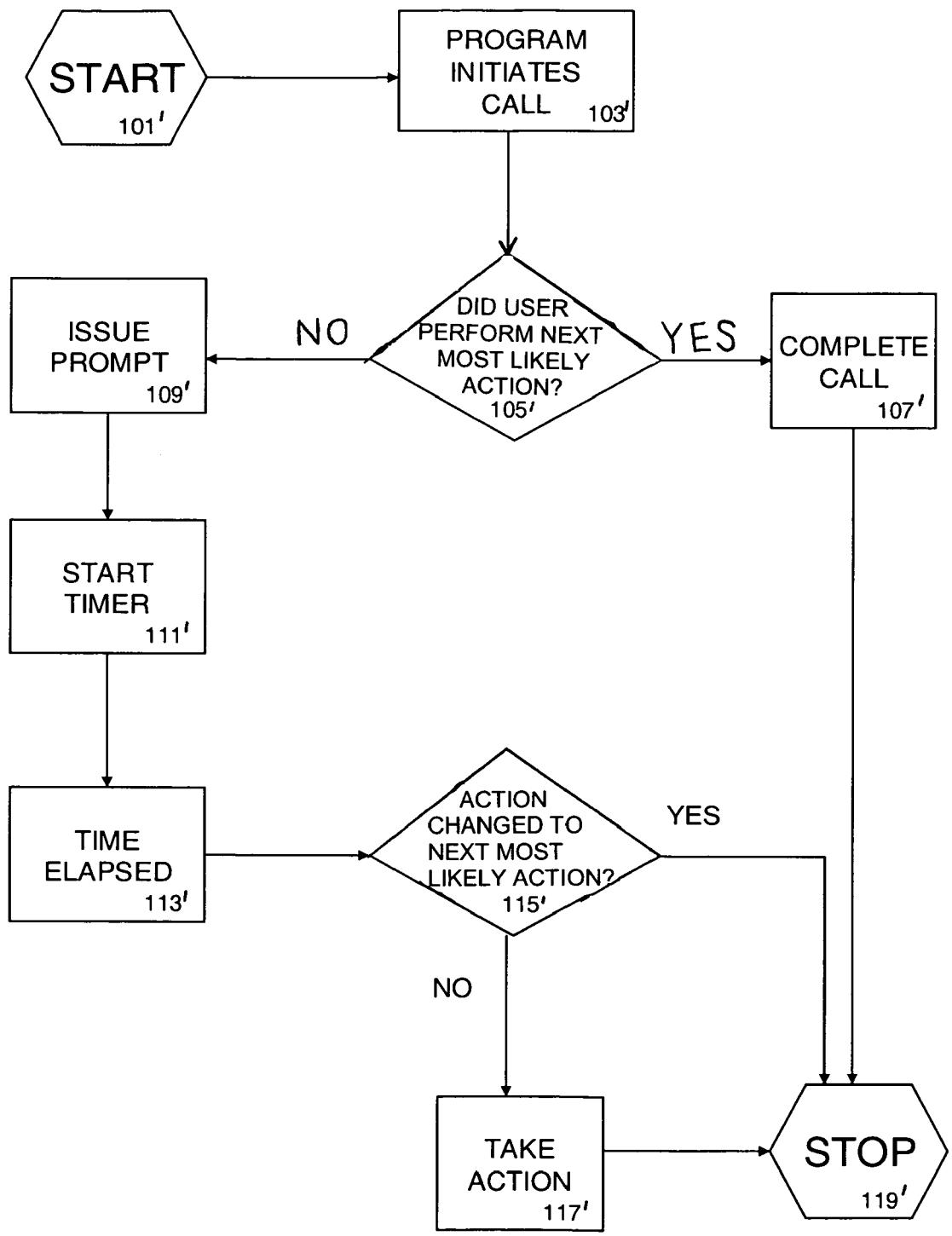
FIG. 2 shows a flowchart of prompting a user who interacts with content on a display screen to indicate that a potential mistake may have been made during the interaction in accordance with another preferred embodiment of the present invention.

FIG. 2 shows a flow chart of another embodiment of the present invention. FIG. 2 is similar to FIG. 1, except that step 105' checks to determine if the next most likely action occurred, and step 115' checks to determine if the user's next action was changed to the next most likely action.

In one embodiment of the present invention, a probable mistake may be any next action that is not the next most likely action. In another embodiment of the present invention, a probable mistake is not necessarily any action that is not the next most likely action, but are specifically coded actions that are deemed to be probable mistakes.

Figure 3:
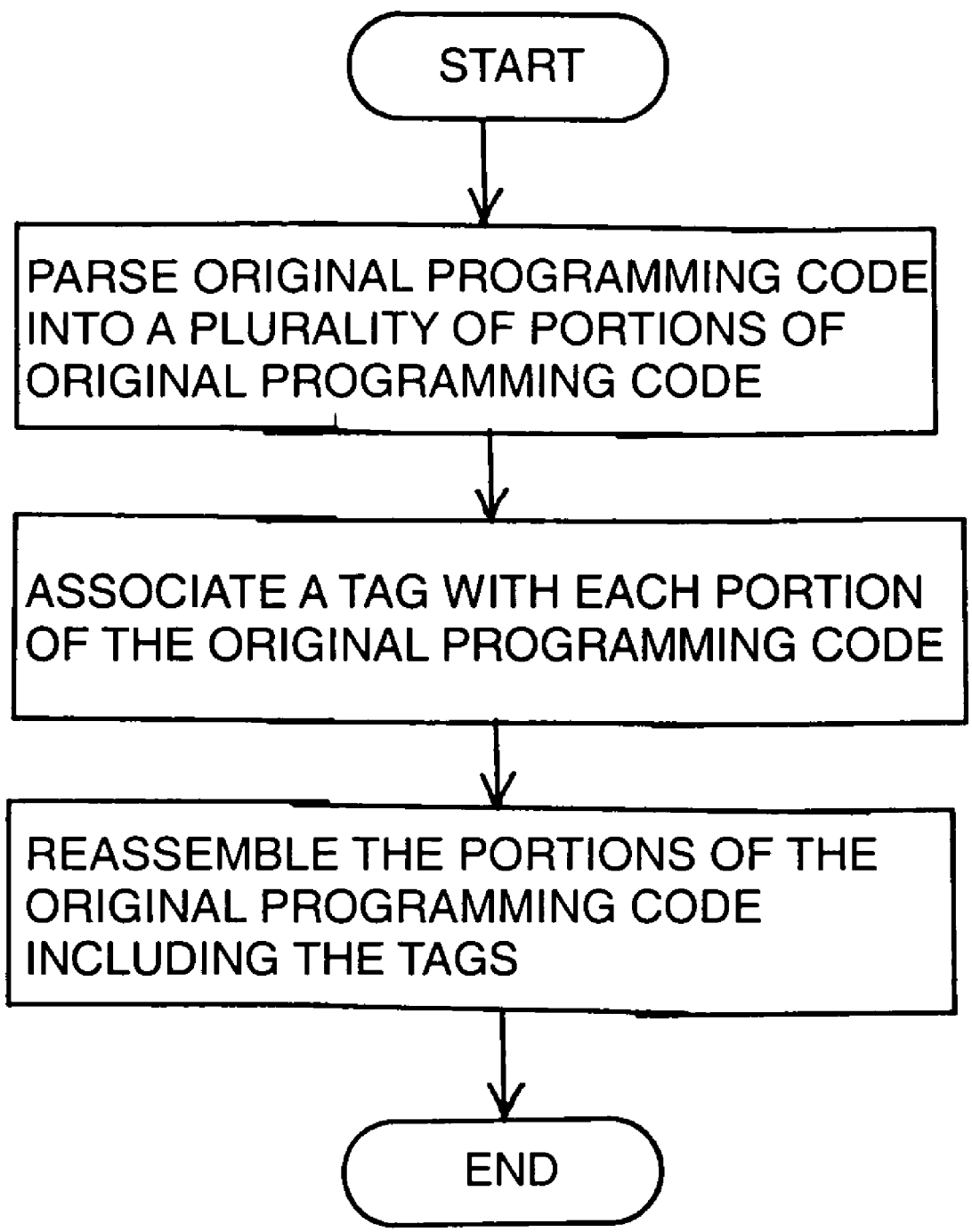
FIG. 3 shows a flowchart of a method of creating reassembled programming code which defines sequentially ordered tasks to be performed by original programming code in accordance with another preferred embodiment of the present invention.

As also described above, one preferred embodiment of the present invention shown in FIG. 3 creates reassembled programming code which defines sequentially ordered tasks to be performed by original programming code. At least some of the original programming code is parsed into a plurality of portions of original programming code. Each portion of the original programming code is associated with a task. A tag, such as a span tag, is then associated with each portion of the original programming code. The tag defines sequence information regarding the portion of the original programming code in relation to other portions of the original programming code. The programming code including the tags is then reassembled. The reassembled programming code is used to assist a user to perform the tasks defined by the original programming code in a desired sequence. The original and reassembled programming code may be HTML code that defines a portion of text. If so, the plurality of portions of the original programming code is a plurality of sequentially arranged grammatical units, such as sentences, that define the portion of the text, each tag thereby being associated with a grammatical unit. At least some of the tasks are to cause the grammatical units to be electronically read by a text-to-speech reader.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of prompting a user who interacts with content on a display screen via a pointing device to indicate that a potential mistake may have been made during the interaction, wherein the interaction includes a plurality of navigation-related actions associated with the content of the display screen, the content being created by programming code, the method comprising:
   (a) electronically predefining an order for selecting the content on the display screen;
   (b) analyzing the programming code to determine the next most likely navigation-related action to occur during user interaction with the display screen content at a plurality of different points in the programming code, wherein the next most likely navigation-related action to occur is determined based on the predefined order;
   (c) after a navigation-related action occurs by a user at a point in the programming code, detecting whether the user performed the next most likely navigation-related action; and
   (d) prompting the user with an indication if the user did not perform the next most likely navigation-related action and therefore may have made a potential mistake, wherein the content on the display screen is the same content during the occurrence of each of the plurality of navigation-related actions performed by the user.

2. The method of claim 1 wherein step (d) further comprises inhibiting the user's navigation-related action in step (c) from occurring for at least a human perceptible predetermined period of time if the user did not perform the next most likely navigation-related action.

3. The method of claim 2 further comprising:
   (e) if the user has not modified his or her navigation-related action to be the next most likely navigation-related action by the predetermined period of time, allowing the user's latest navigation-related action to occur.

4. The method of claim 2 further comprising:
   (e) if the user has not modified his or her navigation-related action to be the next most likely navigation-related action by the predetermined period of time, repeating step (d).

5. The method of claim 2 further comprising:
   (e) if the user has not modified his or her navigation-related action to be the next most likely navigation-related action by the predetermined period of time, automatically performing the next most likely navigation-related action and ignoring the user's navigation-related actions.

6. The method of claim 1 wherein the indication is an audiovisual message or signal.

7. The method of claim 6 wherein the indication is the highlighting of selected text on the display screen.

8. The method of claim 1 wherein the indication is a message or signal that communicates to the user what the next most likely navigation-related action is.

9. The method of claim 1 wherein at least some of the programming code defines text, and at least some of the navigation-related actions are to cause text defined by the programming code to be electronically read by a text-to-speech reader.

10. A method of prompting a user who interacts with content on a display screen via a pointing device to indicate that a potential mistake may have been made during the interaction, wherein the interaction includes a plurality of navigation-related actions associated with the content of the display screen, the content being created by programming code, the method comprising:
    (a) electronically predefining an order for selecting the content on the display screen
    (b) analyzing the programming code to determine the next most likely navigation-related action to occur during user interaction with the display screen content at a plurality of different points in the programming code, wherein the next most likely navigation-related action to occur is determined based on the predefined order;
    (c) prestoring next navigation-related actions that are likely mistakes at a plurality of different points in the programming code, wherein navigation-related actions that are likely mistakes are navigation-related actions that are not the next most likely navigation-related action to occur as determined in step (b);
    (d) after a navigation-related action occurs by a user at a point in the programming code, detecting whether the user performed a likely mistake; and
    (e) prompting the user with an indication if the user performed a likely mistake,
        wherein the content on the display screen is the same content during the occurrence of each of the plurality of navigation-related actions performed by the user.

11. The method of claim 10 wherein step (e) further comprises inhibiting the user's navigation-related action in step (d) from occurring for at least a human perceptible predetermined period of time if the user performed a likely mistake.

12. The method of claim 11 further comprising:
    (f) if the user has not modified his or her navigation-related action to be a navigation-related action that is not a likely mistake by the predetermined period of time, allowing the user's latest navigation-related action to occur.

13. The method of claim 11 further comprising:
    (f) if the user has not modified his or her navigation-related action to be a navigation-related action that is not a likely mistake by the predetermined period of time, repeating step (e).

14. The method of claim 11 further comprising:
    (f) if the user has not modified his or her navigation-related action to be a navigation-related action that is not a likely mistake by the predetermined period of time, ignoring the user's navigation-related actions and automatically performing a next navigation-related action that is not a likely mistake.

15. The method of claim 10 wherein the indication is an audiovisual message or signal.

16. The method of claim 15 wherein the indication is the highlighting of selected text on the display screen.

17. The method of claim 10 wherein the indication is a message or signal that communicates to the user what the next navigation-related action should be.

18. The method of claim 10 wherein a navigation-related action likely to be a mistake is a navigation-related action that is not the navigation-related action that is most likely to occur next.

19. The method of claim 10 wherein at least some of the programming code defines text, and at least some of the navigation-related actions are to cause text defined by the programming code to be electronically read by a text-to-speech reader.

20. An article of manufacture for prompting a user who interacts with content on a display screen via a pointing device to indicate that a potential mistake may have been made during the interaction, wherein the interaction includes a plurality of navigation-related actions associated with the content of the display screen, the content being created by programming code, the article of manufacture comprising a computer-readable medium holding computer-executable instructions for performing a method comprising:
- (a) electronically predefining an order for selecting the content on the display screen;
- (b) analyzing the programming code to determine the next most likely navigation-related action to occur during user interaction with the display screen content at a plurality of different points in the programming code, wherein the next most likely navigation-related action to occur is determined based on the predefined order;
- (c) after a navigation-related action occurs by a user at a point in the programming code, detecting whether the user performed the next most likely navigation-related action; and
- (d) prompting the user with an indication if the user did not perform the next most likely navigation-related action and therefore may have made a potential mistake,
  - wherein the content on the display screen is the same content during the occurrence of each of the plurality of navigation-related actions performed by the user.

21. The article of manufacture of claim 20 wherein step (d) further comprises inhibiting the user's navigation-related action in step (c) from occurring for at least a human perceptible predetermined period of time if the user did not perform the next most likely navigation-related action.

22. The article of manufacture of claim 21 wherein the computer-executable instructions perform a method further comprising:
- (e) if the user has not modified his or her navigation-related action to be the next most likely navigation-related action by the predetermined period of time, allowing the user's latest navigation-related action to occur.

23. The article of manufacture of claim 21 wherein the computer-executable instructions perform a method further comprising:
- (e) if the user has not modified his or her navigation-related action to be the next most likely navigation-related action by the predetermined period of time, repeating step (d).

24. The article of manufacture of claim 21 wherein the computer-executable instructions perform a method further comprising:
- (e) if the user has not modified his or her navigation-related action to be the next most likely navigation-related action by the predetermined period of time, automatically performing the next most likely navigation-related action and ignoring the user's navigation-related actions.

25. The article of manufacture of claim 20 wherein the indication is an audiovisual message or signal.

26. The article of manufacture of claim 25 wherein the indication is the highlighting of selected text on the display screen.

27. The article of manufacture of claim 20 wherein the indication is a message or signal that communicates to the user what the next most likely navigation-related action is.

28. The article of manufacture of claim 20 wherein at least some of the programming code defines text, and at least some of the navigation-related actions are to cause text defined by the programming code to be electronically read by a text-to-speech reader.

29. An article of manufacture for prompting a user who interacts with content on a display screen via a pointing device to indicate that a potential mistake may have been made during the interaction, wherein the interaction includes a plurality of navigation-related actions associated with the content of the display screen, the content being created by programming code, the article of manufacture comprising a computer-readable medium holding computer-executable instructions for performing a method comprising:
- (a) electronically predefining an order for selecting the content on the display screen
- (b) analyzing the programming code to determine the next most likely navigation-related action to occur during user interaction with the display screen content at a plurality of different points in the programming code, wherein the next most likely navigation-related action to occur is determined based on the predefined order;
- (c) prestoring next navigation-related actions that are likely mistakes at a plurality of different points in the programming code, wherein navigation-related actions that are likely mistakes are navigation-related actions that are not the next most likely navigation-related action to occur as determined in step (b);
- (d) after a navigation-related action occurs by a user at a point in the programming code, detecting whether the user performed a likely mistake; and
- (e) prompting the user with an indication if the user performed a likely mistake,
  - wherein the content on the display screen is the same content during the occurrence of each of the plurality of navigation-related actions performed by the user.

30. The article of manufacture of claim 29 wherein step (e) further comprises inhibiting the user's navigation-related action in step (d) from occurring for at least a human perceptible predetermined period of time if the user performed a likely mistake.

31. The article of manufacture of claim 30 wherein the computer-executable instructions perform a method further comprising:
- (f) if the user has not modified his or her navigation-related action to be a navigation-related action that is not a likely mistake by the predetermined period of time, allowing the user's latest navigation-related action to occur.

32. The article of manufacture of claim 30 wherein the computer-executable instructions perform a method further comprising:
- (f) if the user has not modified his or her navigation-related action to be a navigation-related action that is not a likely mistake by the predetermined period of time, repeating step (e).

33. The article of manufacture of claim 30 wherein the computer-executable instructions perform a method further comprising:
- (f) if the user has not modified his or her navigation-related action to be a navigation-related action that is not a likely mistake by the predetermined period of time, ignoring the user's navigation-related actions and automatically performing a next navigation-related action that is not a likely mistake.

34. The article of manufacture of claim 29 wherein the indication is an audiovisual message or signal.

35. The article of manufacture of claim 34 wherein the indication is the highlighting of selected text on the display screen.

36. The article of manufacture of claim 29 wherein the indication is a message or signal that communicates to the user what the next navigation-related action should be.

37. The article of manufacture of claim 29 wherein a navigation-related action likely to be a mistake is a navigation-related action that is not the navigation-related action that is most likely to occur next.

38. The article of manufacture of claim 29 wherein at least some of the programming code defines text, and at least some of the navigation-related actions are to cause text defined by the programming code to be electronically read by a text-to-speech reader.

39. A method of prompting a user who interacts with content on a display screen via a pointing device to indicate that a potential mistake may have been made during the interaction, wherein the interaction includes a plurality of actions associated with the content of the display screen, the content being created by programming code, the method comprising:
  (a) electronically predefining an order for selecting the content on the display screen;
  (b) analyzing the programming code to determine the next most likely action to occur during user interaction with the display screen content at a plurality of different points in the programming code, wherein the next most likely navigation-related action to occur is determined based on the predefined order;
  (c) after an action occurs by a user at a point in the programming code, detecting whether the user performed the next most likely action; and
  (d) prompting the user with an indication if the user did not perform the next most likely action and therefore may have made a potential mistake, and inhibiting the user's action in step (c) from occurring for at least a predetermined period of time if the user did not perform the next most likely action,
    wherein the content on the display screen is the same content during the user interaction at each of the plurality of different points in the programming code.

40. The method of claim 39 further comprising:
  (e) if the user has not modified his or her action to be the next most likely action by the predetermined period of time, allowing the user's latest action to occur.

41. The method of claim 39 further comprising:
  (e) if the user has not modified his or her action to be the next most likely action by the predetermined period of time, repeating step (d).

42. The method of claim 39 further comprising:
  (e) if the user has not modified his or her action to be the next most likely action by the predetermined period of time, automatically performing the next most likely action and ignoring the user's actions.

43. A method of prompting a user who interacts with content on a display screen via a pointing device to indicate that a potential mistake may have been made during the interaction, wherein the interaction includes a plurality of actions associated with the content of the display screen, the content being created by programming code, the method comprising:
  (a) electronically predefining an order for selecting the content on the display screen;
  (b) analyzing the programming code to determine the next most likely action to occur during user interaction with the display screen content at a plurality of different points in the programming code, wherein the next most likely navigation-related action to occur is determined based on the predefined order;
  (c) prestoring next actions that are likely mistakes at a plurality of different points in the programming code, wherein actions that are likely mistakes are actions that are not the next most likely action to occur as determined in step (b);
  (d) after an action occurs by a user at a point in the programming code, detecting whether the user performed a likely mistake; and
  (e) prompting the user with an indication if the user performed a likely mistake, and inhibiting the user's action in step (d) from occurring for at least a predetermined period of time if the user performed a likely mistake,
    wherein the content on the display screen is the same content during the user interaction at each of the plurality of different points in the programming code.

44. The method of claim 43 further comprising:
  (f) if the user has not modified his or her action to be an action that is not a likely mistake by the predetermined period of time, allowing the user's latest action to occur.

45. The method of claim 43 further comprising:
  (f) if the user has not modified his or her action to be an action that is not a likely mistake by the predetermined period of time, repeating step (e).

46. The method of claim 43 further comprising:
  (f) if the user has not modified his or her action to be an action that is not a likely mistake by the predetermined period of time, ignoring the user's actions and automatically performing a next action that is not a likely mistake.

47. An article of manufacture for prompting a user who interacts with content on a display screen via a pointing device to indicate that a potential mistake may have been made during the interaction, wherein the interaction includes a plurality of actions associated with the content of the display screen, the content being created by programming code, the article of manufacture comprising a computer-readable medium holding computer-executable instructions for performing a method comprising:
  (a) electronically predefining an order for selecting the content on the display screen;
  (b) analyzing the programming code to determine the next most likely action to occur during user interaction with the display screen content at a plurality of different points in the programming code, wherein the next most likely navigation-related action to occur is determined based on the predefined order;
  (c) after an action occurs by a user at a point in the programming code, detecting whether the user performed the next most likely action; and
  (d) prompting the user with an indication if the user did not perform the next most likely action and therefore may have made a potential mistake, and inhibiting the user's action in step (c) from occurring for at least a predetermined period of time if the user did not perform the next most likely action,
    wherein the content on the display screen is the same content during the user interaction at each of the plurality of different points in the programming code.

48. The article of manufacture of claim 47 wherein the computer-executable instructions perform a method further comprising:
  (e) if the user has not modified his or her action to be the next most likely action by the predetermined period of time, allowing the user's latest action to occur.

49. The article of manufacture of claim 47 wherein the computer-executable instructions perform a method further comprising:
  (e) if the user has not modified his or her action to be the next most likely action by the predetermined period of time, repeating step (d).

50. The article of manufacture of claim 47 wherein the computer-executable instructions perform a method further comprising:

(e) if the user has not modified his or her action to be the next most likely action by the predetermined period of time, automatically performing the next most likely action and ignoring the user's actions.

51. An article of manufacture for prompting a user who interacts with content on a display screen via a pointing device to indicate that a potential mistake may have been made during the interaction, wherein the interaction includes a plurality of actions associated with the content of the display screen, the content being created by programming code, the article of manufacture comprising a computer-readable medium holding computer-executable instructions for performing a method comprising:

(a) electronically predefining an order for selecting the content on the display screen;

(b) analyzing the programming code to determine the next most likely action to occur during user interaction with the display screen content at a plurality of different points in the programming code, wherein the next most likely navigation-related action to occur is determined based on the predefined order;

(c) prestoring next actions that are likely mistakes at a plurality of different points in the programming code, wherein actions that are likely mistakes are actions that are not the next most likely action to occur as determined in step (b);

(d) after an action occurs by a user at a point in the programming code, detecting whether the user performed a likely mistake; and (e) prompting the user with an indication if the user performed a likely mistake, and inhibiting the user's action in step (d) from occurring for at least a predetermined period of time if the user performed a likely mistake, wherein the content on the display screen is the same content during the user interaction at each of the plurality of different points in the programming code.

52. The article of manufacture of claim 51 wherein the computer-executable instructions perform a method further comprising:

(f) if the user has not modified his or her action to be an action that is not a likely mistake by the predetermined period of time, allowing the user's latest action to occur.

53. The article of manufacture of claim 51 wherein the computer-executable instructions perform a method further comprising:

(f) if the user has not modified his or her action to be an action that is not a likely mistake by the predetermined period of time, repeating step (e).

54. The article of manufacture of claim 51 wherein the computer-executable instructions perform a method further comprising:

(f) if the user has not modified his or her action to be an action that is not a likely mistake by the predetermined period of time, ignoring the user's actions and automatically performing a next action that is not a likely mistake.

* * * * *